H. F. MARANVILLE.
TIRE CONSTRUCTION.
APPLICATION FILED JULY 26, 1918.
1,329,463.
Patented Feb. 3, 1920.
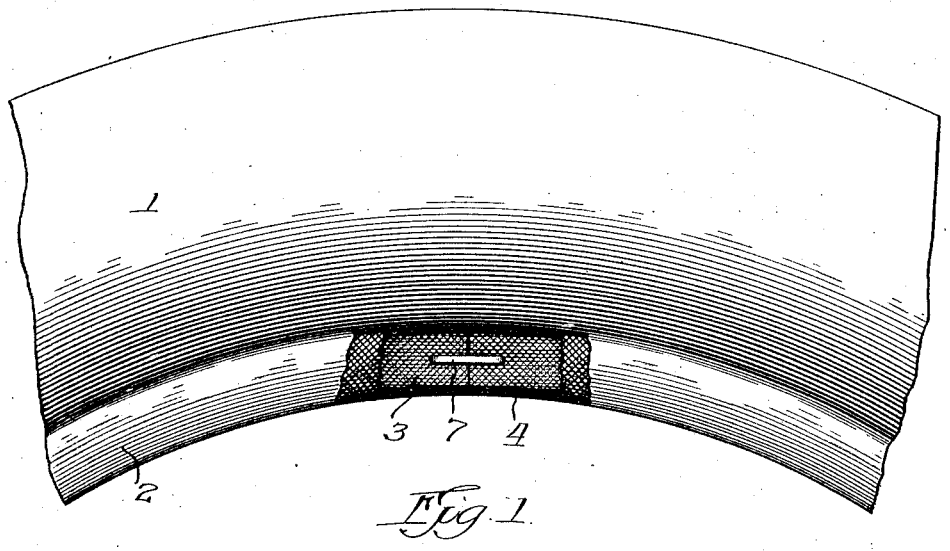
Fig. 1.
Fig. 2.
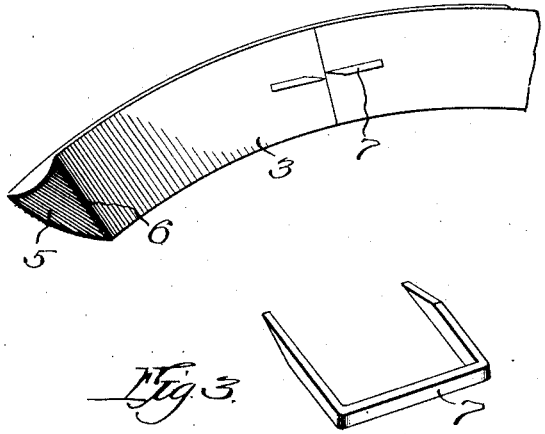
Fig. 3.
Witness:
Inventor:
Harvey F. Maranville
By G. L. Ely, atty

UNITED STATES PATENT OFFICE.

HARVEY F. MARANVILLE, OF AKRON, OHIO, ASSIGNOR TO THE FIRESTONE TIRE AND RUBBER COMPANY, OF AKRON, OHIO, A CORPORATION OF OHIO.

TIRE CONSTRUCTION.

1,329,463.

Specification of Letters Patent.

Patented Feb. 3, 1920.

Application filed July 26, 1918. Serial No. 246,946.

*To all whom it may concern:*

Be it known that I, HARVEY F. MARANVILLE, a citizen of the United States, and a resident of Akron, Summit county, State of Ohio, have invented certain new and useful Improvements in Tire Constructions, of which the following is a specification.

This invention relates to a new method of manufacturing tires, and particularly to a new mode of construction of the bead portion of the tire, particularly in that type known as the clencher variety in which the bead is constructed of a stretchable rubber compound. Many different methods of joining the ends of beads have been in use, but they have been more or less unsatisfactory and have failed to create a strong bond between the ends of the beads. It is my purpose to create a permanent connection for the ends of the beads which will be easy and inexpensive to manufacture.

The drawings accompanying this specification show my invention as applied to the manufacture of clencher automobile tires, in which drawings—

Figure 1 is a side elevation of a portion of the automobile tire with the covering removed from around the meeting ends of the beads.

Fig. 2 is a perspective view of a portion of the meeting ends of the beads.

Fig. 3 is a view showing the method used for joining the beads.

In the manufacture of pneumatic tires, the bead is often formed by extrusion from the dies, the extruded strip being cut to exact lengths to go around the tire. The beads are covered with a light fabric and are partially cured to the shape they are to assume in the finished tire. It is now necessary to bring the beads to a complete circle which can be placed in the bead ring on the tire machine for accurate positioning in the carcass of the tire.

Heretofore various methods of splicing have been devised, which have been more or less unsatisfactory as the ends of the beads would pull apart with the rough handling to which they are subjected by the tire builders. It is necessary to cover the splices, or meeting ends, of the beads with a light fabric increasing the expense of tire manufacturing. I propose, instead of making these various forms of splices, to hold the ends of the beads together by a staple. The staple can be formed very easily and constitutes a firm junction for the ends of the beads precluding any possibility of separation. The beads being situated in the lower edges of the tire and being held within the rim in service, no action whatever takes place at this point and the presence of the metal is not detrimental.

In the drawings 1 indicates the main portion of the tire case and 2 the bead in which is included the bead core 3 between the covering plies of the carcass which are indicated by the numeral 4. The bead is shown in Fig. 2 separate from the tire and in the condition before being placed in this position in the tire during manufacture. The inside portion of the bead is marked 5 which indicates the rubber center which has been extruded from the die and formed by vulcanization. 6 represents the fabric covering which surrounds the bead. The staple is shown in Fig. 3 being indicated by the numeral 7. Fig. 2 shows the way in which the ends of the staple are bent down to clamp the beads together.

It will be noted that the ends of the bead may be cut on a straight line and that they are butted or pressed closely together before being stapled, as indicated by the single line in Figs. 1 and 2. When the beads are thus stapled, the ends are in contact and a tight joint is assured, which will give a fixed bead circumference, and does not require covering as has been the case with previous bead constructions. Other forms of joints may be made without departing from the invention, the essential feature of which is the use of a staple or equivalent means to unite the ends of the bead.

I claim:

1. In pneumatic tire construction, a carcass having a one piece bead core, in the bead, and a staple holding together the ends of the bead core.

2. In the process of manufacturing pneumatic tires, extruding the bead core forming a length sufficient to go around the tire, bringing the ends together and stapling them, and embodying the so formed continuous bead core in the tire structure.

3. In the process of manufacturing pneumatic tires, forming the bead core in lengths sufficient to go around the tire, bringing the ends together and stapling them, and embodying the so formed continuous bead core in the tire structure.

4. The process of manufacturing tire beads, comprising the steps of forming a bead core, partially vulcanizing the core, cutting the core into lengths equal to the circumference at the base of the tire, abutting the ends of the bead, and uniting the ends of the bead with a single fastener, adapted to pierce the beads and prevent separation of the ends thereof.

5. The process of manufacturing tire beads, comprising the steps of forming a bead core, cutting the core to lengths equal to the circumference at the base of the tire, placing the ends of the bead together, and fastening them by a metallic fastener bridging the joint and passing through the ends of the bead.

6. The process of manufacturing tire beads, comprising the steps of forming a partially vulcanized bead core, cutting the core to the proper length to form a single bead, abutting the ends of the bead, and passing a staple through the ends of the bead to hold the bead in a fixed circumference.

7. A tire bead comprising a single length of bead core with the ends formed on a straight line, and a metallic fastener joining the ends of the bead together.

HARVEY F. MARANVILLE.